US011795836B2

(12) United States Patent
Iglesias Cano et al.

(10) Patent No.: US 11,795,836 B2
(45) Date of Patent: Oct. 24, 2023

(54) VANE MADE OF COMPOSITE MATERIAL COMPRISING METALLIC REINFORCEMENTS, AND METHOD FOR MANUFACTURING SUCH A VANE

(71) Applicant: SAFRAN, Paris (FR)

(72) Inventors: Célia Iglesias Cano, Moissy-Cramayel (FR); Antoine Hubert Marie Jean Masson, Moissy-Cramayel (FR); Enrico Giovanni Obert, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/996,024

(22) PCT Filed: Apr. 12, 2021

(86) PCT No.: PCT/FR2021/050642
§ 371 (c)(1),
(2) Date: Oct. 12, 2022

(87) PCT Pub. No.: WO2021/209709
PCT Pub. Date: Oct. 21, 2021

(65) Prior Publication Data
US 2023/0184133 A1 Jun. 15, 2023

(30) Foreign Application Priority Data
Apr. 14, 2020 (FR) ........................ 2003729

(51) Int. Cl.
*F01D 25/00* (2006.01)
*B29C 45/14* (2006.01)
(Continued)

(52) U.S. Cl.
CPC ...... *F01D 25/005* (2013.01); *B29C 45/14336* (2013.01); *B29C 45/14631* (2013.01);
(Continued)

(58) Field of Classification Search
CPC ........ F01D 25/005; F01D 9/041; F01D 5/282; B29C 45/14336; B29C 45/14631;
(Continued)

(56) References Cited

U.S. PATENT DOCUMENTS

2013/0052030 A1   2/2013   McCaffrey
2013/0259701 A1*  10/2013  Dambrine ............... B22F 3/15
                                                         228/176

(Continued)

FOREIGN PATENT DOCUMENTS

FR    3 079 445 A1    10/2019
WO    2013/060977 A2   5/2013
WO    2018/158544 A1   9/2018

OTHER PUBLICATIONS

International Search Report dated Aug. 6, 2021, issued in corresponding International Application No. PCT/FR2021/050642, filed Apr. 12, 2021, 5 pages.

(Continued)

*Primary Examiner* — Binh Q Tran
(74) *Attorney, Agent, or Firm* — CHRISTENSEN O'CONNOR JOHNSON KINDNESS PLLC

(57) ABSTRACT

A method for manufacturing a blade made of composite material for a turbine engine, in particular of an aircraft, the steps of injecting a resin in order to impregnate a fibrous preform woven in three dimensions and polymerizing the resin so as to form the blade that includes an airfoil, one longitudinal end of which is connected to a platform. The platform includes pressure and suction portions connected to the airfoil by a fillet, wherein a separation is formed in the fibrous preform between the pressure and suction portions. The method further includes reinforcing a leading edge of the airfoil; and reinforcing the fillets by integration of a (Continued)

metal reinforcement on at least one part of the pressure and suction portions of the platform and in the separation.

11 Claims, 3 Drawing Sheets

(51) Int. Cl.
  B29C 45/16      (2006.01)
  F01D 9/04       (2006.01)
  B29K 307/04     (2006.01)
  B29K 705/08     (2006.01)
  B29L 31/08      (2006.01)
  B29C 64/147     (2017.01)
  B29C 70/02      (2006.01)
  B29C 70/08      (2006.01)
  B29C 64/205     (2017.01)
  B29C 70/20      (2006.01)
  B29C 70/88      (2006.01)

(52) U.S. Cl.
  CPC .......... *B29C 45/1671* (2013.01); *F01D 9/041* (2013.01); *B29C 64/147* (2017.08); *B29C 64/205* (2017.08); *B29C 70/021* (2013.01); *B29C 70/08* (2013.01); *B29C 70/085* (2013.01); *B29C 70/202* (2013.01); *B29C 70/885* (2013.01); *B29K 2307/04* (2013.01); *B29K 2705/08* (2013.01); *B29L 2031/082* (2013.01); *F05D 2220/323* (2013.01); *F05D 2230/21* (2013.01); *F05D 2240/12* (2013.01); *F05D 2240/123* (2013.01); *F05D 2300/6032* (2013.01); *F05D 2300/6034* (2013.01); *F05D 2300/615* (2013.01)

(58) Field of Classification Search
  CPC . B29C 45/1671; B29C 64/147; B29C 64/171; B29C 64/205; B29C 70/02; B29C 70/021; B29C 70/06; B29C 70/08; B29C 70/083; B29C 70/085; B29C 70/202; B29C 70/205; B29C 70/207; B29C 70/24; B29C 70/48; B29C 70/86; B29C 70/885; B29C 2045/1696; B29K 2105/06; B29K 2105/0827; B29K 2105/0836; B29K 2307/04; B29K 2705/08; B29L 2031/082; F05D 2220/323; F05D 2230/21; F05D 2240/12; F05D 2300/6034; F05D 2220/36; F05D 2240/121; F05D 2240/123; F05D 2240/124; F05D 2240/80; F05D 2260/941; F05D 2300/133; F05D 2300/603; F05D 2300/6032; F05D 2300/614; F05D 2300/615; Y02T 50/60
  See application file for complete search history.

(56)   References Cited

U.S. PATENT DOCUMENTS

| | | | |
|---|---|---|---|
| 2017/0081752 A1* | 3/2017 | Hanley | B29C 64/153 |
| 2018/0147797 A1* | 5/2018 | Chassignet | B29C 70/543 |
| 2021/0010377 A1* | 1/2021 | Blanquart | B29C 66/73754 |
| 2022/0362856 A1* | 11/2022 | Suchel | G06F 30/15 |
| 2022/0402218 A1* | 12/2022 | Touze | F01D 5/288 |
| 2023/0036890 A1* | 2/2023 | Touze | B29C 70/24 |
| 2023/0193766 A1* | 6/2023 | Postec | B29C 70/48 416/230 |

OTHER PUBLICATIONS

Written Opinion dated Aug. 6, 2021, issued in corresponding International Application No. PCT/FR2021/050642, filed Apr. 12, 2021, 6 pages.

English translation of Written Opinion dated Aug. 6, 2021, issued in corresponding International Application No. PCT/FR2021/050642, filed Apr. 12, 2021, 6 pages.

International Preliminary Report on Patentability dated Oct. 13, 2022, issued in corresponding International Application No. PCT/FR2021/050642, filed Apr. 12, 2021, 7 pages.

* cited by examiner

VANE MADE OF COMPOSITE MATERIAL COMPRISING METALLIC REINFORCEMENTS, AND METHOD FOR MANUFACTURING SUCH A VANE

TECHNICAL FIELD

The invention relates to the field of vanes made of composite material for a turbomachine, in particular for an aircraft, and more specifically to the improvement of the mechanical strength of such a composite material vane.

BACKGROUND

The prior art comprises in particular the documents WO 2013/060977 A2, FR 3 079 445 A1, WO 2018/158544 A1 and US 2013/052030 A1.

Outlet guide vanes (OGV) are known to be used in aeronautics. An OGV is a stationary blading whose function is to straighten the flow at the outlet of a fan vane into the secondary flow of a turbomachine.

The OGV form rows of stationary vanes that allow the flow passing through the turbomachine to be guided at an appropriate speed and angle.

By convention, in this application, the terms "upstream" and "downstream" are defined in relation to the direction of airflow in the turbomachine. Also, by convention in this application, the terms "inner" and "outer" or "internal" and "external" are defined radially with respect to the axis of the turbomachine.

The OGV can be metallic, or made of composite material, in particular to reduce their mass.

Currently, the composite OGV are produced by injecting epoxy resin, for example by Resin Transfer Molding (RTM), into a three-dimensionally (3D) woven carbon fibre preform.

FIG. 1 shows an OGV 10 which comprises a blade 12 having a pressure face 18 and a suction face 28 extending between a leading edge 14 and a trailing edge 16, and whose longitudinal ends are connected to platforms: inter-OGV platforms 20 fitted to the radial outer end of the blading, and which are arranged between said OGV and the adjacent OGV, and a platform 22 fitted to a radial inner end of the blading, and connected to the hub 24 of the flow straightener.

A metallic reinforcement 26, in the form of a metallic foil, for example Nickel-Cobalt, is co-injected onto the leading edge portion 14 of the blade 12.

Since the composite materials are sensitive to certain mechanical constraints, the metallic reinforcement allows advantageous to protect against erosion and potential impacts of the OGV.

It is also known that a composite OGV has a hybrid architecture with a carbon material braid for the production of the aerodynamic area and a thermoplastic resin (with or without filler) to form the core of the OGV.

However, this OGV has weaker mechanical properties than conventional armour.

Furthermore, the thermoplastic resin only fills the cavity between the attachment platforms for the vane, and therefore does not allow to limit the opening of the platforms, which would reduce the mechanical constraints suffered by the OGV.

Studies have been carried out to analyse the mechanical strength of this OGV. According to the results of a finite-elements model, a systematic concentration of constraints is found at the level of the fillets, shown as dotted lines A, B and C in FIGS. 2, 3 and 4 respectively, i.e. at the level of the junction between the platforms 20, 22 and the blade 12.

The parts were also tested in tensile, compression and bending tests. The calculations show the same failure areas as those found by the expert tests.

There is therefore a need for an OGV, in which the constraints in these failure areas are reduced, and in which the forces are better distributed.

The purpose of the invention is to propose a solution allowing to remedy at least some of these disadvantages.

SUMMARY OF THE INVENTION

The invention allows a limitation of the opening of the platforms of a vane made of composite material for a turbomachine, for a reduction of the constraints in the connection fillets (critical areas) between the blade and the platforms.

To this end, the invention relates to a method for manufacturing a stator vane made of composite material for a turbomachine, in particular for an aircraft, comprising the steps of:
  weaving fibres in three dimensions so as to produce a fibrous preform,
  mounting the fibrous preform in a mould,
  injecting, in the mould, a resin, in order to impregnate the fibrous preform,
  polymerizing the resin so as to form the vane, said vane comprising a blade having a pressure face and a suction face extending between a leading edge and a trailing edge, a longitudinal end of said blade being connected to a platform, the platform comprising pressure and suction segments connected to said blade by a connection fillet, and a separation being formed in said fibrous preform between said pressure and suction segments of the platform,
  reinforcing the leading edge of said blade, by integrating a first metallic reinforcement on the leading edge of the blade,
characterised in that the method also comprises the step of:
  reinforcing the connection fillets, by integrating a second metallic reinforcement on at least one portion of the pressure and suction segments of the platform and in the separation.

According to an embodiment, the step of adding the second metallic reinforcement consists in bonding the second metallic reinforcement to at least one portion of the pressure and suction segments of the platform and in the separation.

According to another embodiment, the step of adding the second metallic reinforcement consists of co-injecting the second metallic reinforcement onto at least one portion of the pressure and suction segments of the platform and into the separation.

The invention also relates to a composite material vane for a turbomachine, in particular for an aircraft, produced by a manufacturing method according to the invention. Thus, this vane comprises a second metallic reinforcement arranged on at least one portion of the pressure and suction segments of the platform and in the separation.

The invention advantageously allows a reduction of the constraints in the connection fillet, i.e. in the critical area, between the blade and the platform, to ensure a mechanical robustness.

Advantageously, the second metallic reinforcement allows to serve as a connection between the pressure and suction segments of the platform, thus allowing to reinforce the critical area. In the context of co-injection, this metallic reinforcement significantly improves the correct formation of the OGV radii, in particular compared to a carbon braid, which is not rigid and does not have the exact shape of the cavity.

The second metallic reinforcement advantageously allows to limit the opening of the pressure and suction segments of the platform, by reducing the constraints at the level of the connection fillet under tensile, compressive and bending stress. In addition, the second metallic reinforcement allows the forces of the connection fillet to be taken up and, in particular in the case of compression, the forces to be distributed over the entire base of the platforms, thus increasing the critical buckling force.

According to one embodiment, a dimension of the second metallic reinforcement in a longitudinal direction to the pressure and suction faces of the blade between the leading and trailing edges is substantially equal to a dimension of the platform in said direction. In other words, the second metallic reinforcement extends along the entire length of the platform.

According to another embodiment, the second metallic reinforcement comprises two portions, each portion of the second metallic reinforcement having a dimension in a longitudinal direction to the pressure and suction faces of the blade between the leading and trailing edges of between 15% and 35% of a chord at the longitudinal end of the blade before the connection fillet. In other words, the second metallic reinforcement extends only along a portion of the length of the platform.

This advantageously allows the mass of the flow straightener vane to be reduced, in particular by lightening the second metallic reinforcement.

A dimension of the second metallic reinforcement in the longitudinal direction of the blade may be between 30% and 70% of a dimension of the platform in said direction. In other words, the thickness of the second metallic reinforcement is between 30% and 70% of the thickness of the platform.

Preferably, the dimension of the second metallic reinforcement in the longitudinal direction of the blade is substantially equal to 50% of the dimension of the platform in this direction.

A dimension of the second metallic reinforcement in a direction orthogonal to the longitudinal direction of the blade and to the longitudinal direction of the pressure and suction faces of the blade between the leading and trailing edges may be at least equal to a dimension of the platform in said direction. In other words, the width of the second metallic reinforcement is at least equal to the width of the platform.

In one embodiment, the platform is a platform radially internal to the straightener with respect to an axis of said straightener. In this embodiment, the second metallic reinforcement comprises, at a longitudinal end facing the trailing edge of the blade, a protuberance extending orthogonally to this platform. This protuberance allows the second metallic reinforcement to have a conical bearing function.

In one embodiment, the second metallic reinforcement is made of titanium. Preferably, the second metallic reinforcement is made of a metallic material that is compatible with the composite material of the flow straightener vane, i.e. a material that does not have incompatibilities with this composite material.

The invention also relates to a composite material vane for an unducted fan, known by the acronyms "propfan" or "open rotor", in particular for aircraft, produced by a manufacturing method according to the invention.

BRIEF DESCRIPTION OF FIGURES

The invention will be better understood and other details, characteristics and advantages of the present invention will become clearer from the following description made by way of non-limiting example and with reference to the attached drawings, in which.

Figure 1:
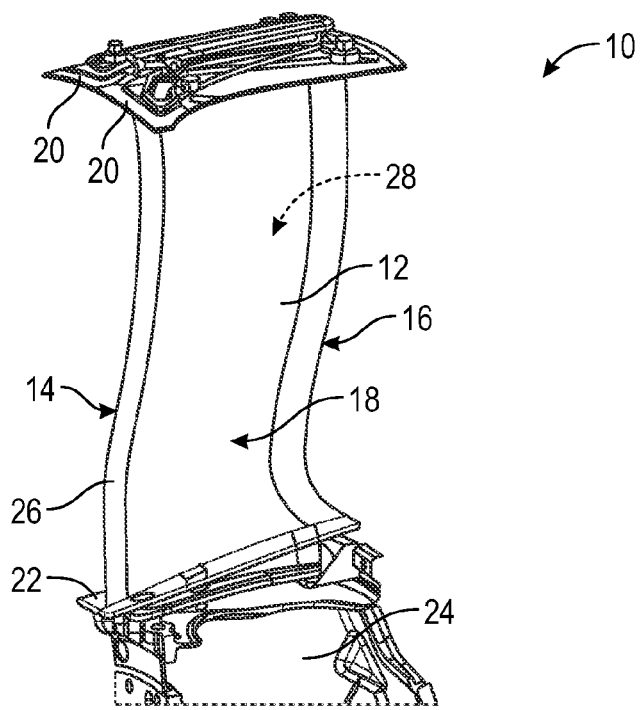
FIG. 1, already described, shows an OGV according to the prior art.
Figures 2, 3:
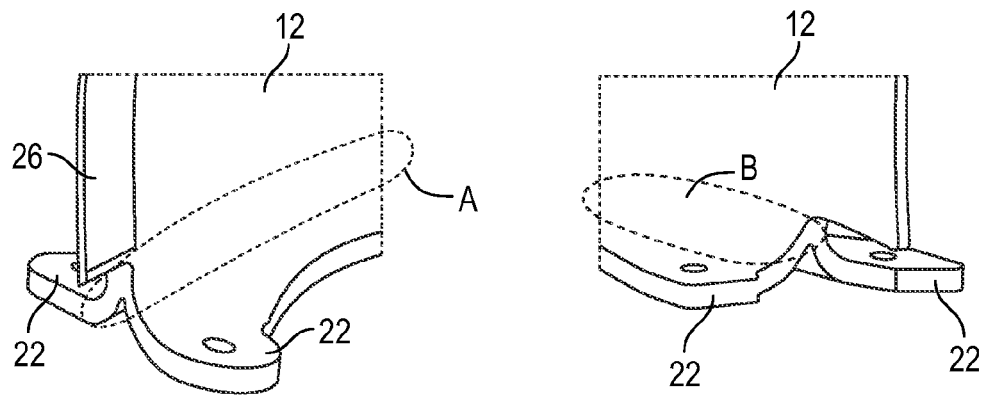
FIG. 2, already described, shows an upstream suction/pressure lower portion of an OGV according to the prior art, FIG. 3, already described, shows the downstream suction/pressure lower portion of an OGV according to the prior art, FIG. 4, already described, shows a downstream suction/pressure upper portion of an OGV according to the prior art.
Figure 4:
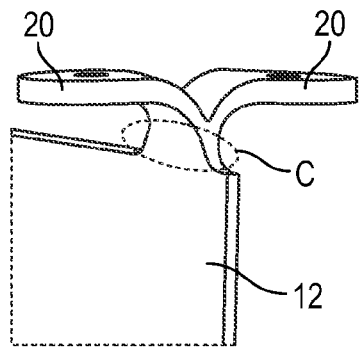

The elements having the same functions in the different embodiments have the same references in the figures.

DESCRIPTION OF THE EMBODIMENTS

FIGS. 5 to 8 show vanes 100 made of composite material for an aircraft turbomachine, for example OGV. The invention also applies to vanes made of composite material for an unducted fan, in particular for aircraft, known by the acronyms "propfan" or "open rotor".

The vane 100 according to the invention, and more precisely the blade 102, is produced from a fibrous preform, for example of carbon fibres, resulting from 3D weaving. The preform is woven in a single part. The preform is then moulded with resin, for example epoxy resin.

The vane 100 comprises a blade 102 with an elongated aerodynamic profile having a pressure face 104 and a suction face 106 extending between a leading edge 108 and a trailing edge 110 opposite the leading edge. In other words, the blade 102 is laterally delimited by the pressure face 104 and the suction face 106 which connect the leading edge 108 and the trailing edge 110. The leading edge 108 is arranged upstream in the flow direction of the gases in the turbomachine. The pressure 104 and suction 106 faces are curved, and concave and convex respectively. The blade 102 extends longitudinally along the axis X, shown in FIGS. 5 to 8.

A first longitudinal end of the blade 102 is connected to a first platform 112, and a second longitudinal end of the blade 102 is connected to a second platform 114. For example, in FIGS. 5, 7 and 8, the lower longitudinal end of the blade 102 is connected to a radially internal platform 112, and in FIG. 6, the upper longitudinal end of the blade 102 is connected to a radially external platform 114. In other words, the blade 102 is radially delimited between an internal platform 112 and an external platform 114. The platforms 112, 114 extend orthogonally to the longitudinal direction of the blade 102, i.e. to the axis X. As shown in FIGS. 5 to 8, the platforms 112, 114 extend along a direction longitudinal to the pressure 104 and suction 106 faces of the blade 102 between the leading 108 and trailing 110 edges, represented by the axis Y, referred to as the longitudinal direction of the platform, and in a direction orthogonal to the longitudinal direction of the blade 102 (axis X) and the longitudinal direction of the platform (axis Y), represented by the axis Z, referred to as the radial direction, or width, of the platform.

Each platform 112, 114 comprises a pressure segment 116 and a suction segment 118. The pressure 116 and suction 118 segments are connected to the blade 102 by a connection fillet 120. In particular, a separation 122 is formed in the fibrous preform forming the vane, between the pressure 116 and suction 118 segments of the platform 112, 114.

The vane 100 also comprises a metallic reinforcement 124, in the form of a metallic foil, fitted to the leading edge 108 of the blade 102. The metallic reinforcement 124 may be made of Nickel-Cobalt, or any other metallic material compatible with the composite material of the vane 100. This metallic reinforcement 124 advantageously allows to improve the mechanical strength of the vane 100.

Figure 5:
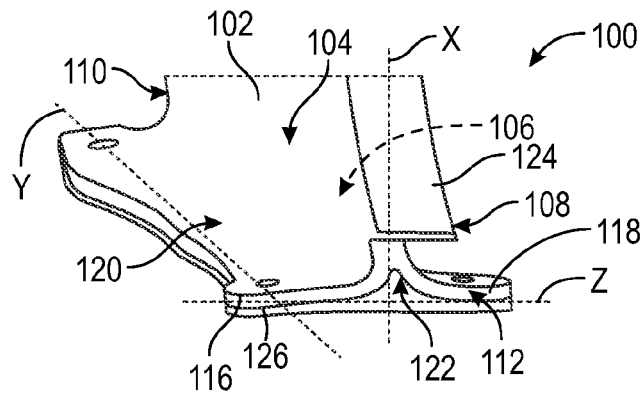
FIG. 5 shows a lower portion of a vane according to one embodiment of the invention.

As shown in FIG. 5, the vane 100 also comprises a metallic reinforcement 126 arranged on at least one portion of the pressure 116 and suction 118 segments of the platform 112 and in the separation 122. This metallic reinforcement 126 allows to strengthen the connection between the blade 102 and the platform 112, and thus reduces the constraints in the connection fillet 120, thus allowing to improve the mechanical strength of the vane 100.

Figure 6:
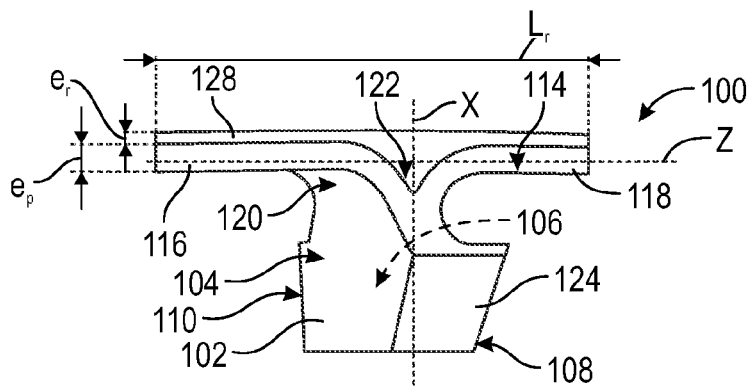
FIG. 6 shows an upper portion of a vane according to one embodiment of the invention.

As shown in FIG. 6, the vane 100 also comprises a metallic reinforcement 128 arranged on at least one portion of the pressure 116 and suction 118 segments of the platform 114 and in the separation 122. Like the metallic reinforcement 126, this metallic reinforcement 128 allows to strengthen the connection between the blade 102 and the platform 114, and thus reduces the constraints in the connection fillet 120, thus allowing to improve the mechanical robustness of the vane 100.

The metallic reinforcements 126, 128 may be made of titanium, or any other metallic material compatible with the composite material of the vane 100.

The metallic reinforcements 126, 128 extend in the longitudinal direction of the platform (axis Y), and in the radial direction of the platform (axis Z).

The metallic reinforcement 128 may extend along the entire length lp (axis Y) of the platform 112, 114. In this case, the dimension of the metallic reinforcement 128 in the longitudinal direction of the platform (axis Y) is substantially equal to the length lp of the platform 112, 114.

Figure 7:
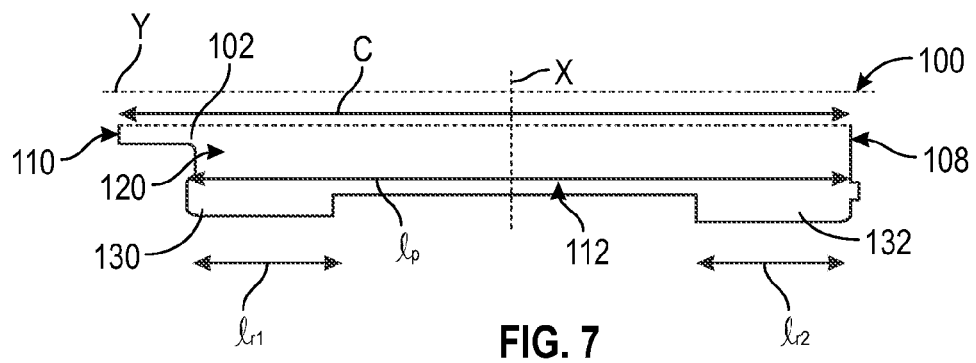
FIG. 7 shows a lower portion of a vane according to another embodiment of the invention.

Alternatively, as shown in FIG. 7, in order to reduce the mass of the vane 100, the metallic reinforcement 128 may extend along only one portion of the length (axis Y) of the platform 112, 114. In this case, the metallic reinforcement may comprise a first portion 130 and a second portion 132. Each portion 130, 132 of the metallic reinforcement has a dimension in the longitudinal direction of the platform (axis Y) of between 15% and 35% of a chord C at the longitudinal end of the blade 102 before the connection fillet 120. The chord C corresponds to the dimension of the blade 102 along the pressure face or suction face between the leading and trailing edges at the level of one end of the blade 102, at the vicinity of the connection fillet 120. As shown in FIG. 7, the length lr1 of the portion 130 of the metallic reinforcement is between 15% and 35% of the chord C, and the length lr2 of the portion 132 of the metallic reinforcement is between 15% and 35% of the chord C. The sum of the lengths lr1 and lr2 of the portions 130, 132 of the metallic reinforcement is smaller than the length lp of the platform 112. Here, the length of the chord C is greater than the length lp of the platform 112.

As shown in FIG. 6, the dimension of the metallic reinforcement 128 in the longitudinal direction of the blade 102 (axis X), i.e. the thickness er of the metallic reinforcement 128, may be between 30% and 70%, depending on the loading, preferably around 50%, of the thickness ep of the platform 114. The radial dimension Lr (axis Z), i.e. the width, of the metallic reinforcement 128 may be at least equal to the radial dimension of the platform 114. Thus, the metallic reinforcement 128 covers the entire base of the platforms 112, 114 and extends to the separation 122. The metallic reinforcement thus covers at least the outline of the entire platform 112, 114.

Figure 8:
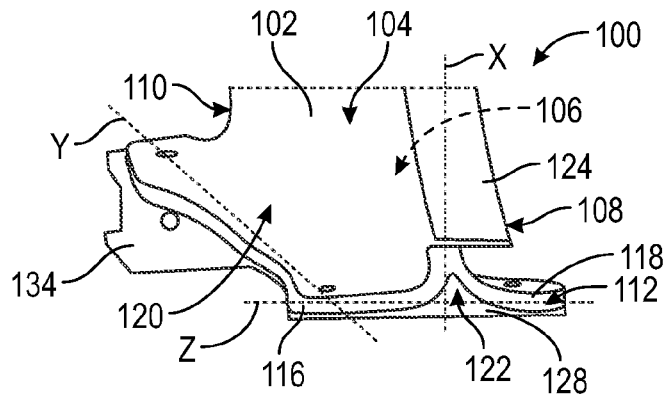
FIG. 8 shows a lower portion of a vane according to yet another embodiment of the invention.

As shown in FIG. 8, the metallic reinforcement 128 comprises, at a longitudinal end facing the trailing edge 110 of the blade 102, a protuberance 134, which extends orthogonally to the platform 112. The protuberance 134 has a conical bearing function. Thus, this metallic reinforcement 128 can make the vane 100 in conical bearing.

Figure 9:
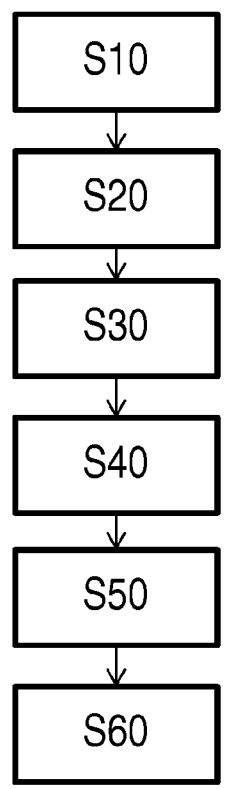
FIG. 9 is a flowchart of a method for manufacturing a vane according to the invention.

The manufacturing method of the vane described above is shown in FIG. 9. The manufacturing method comprises a step S10 of weaving fibres in 3D so as to produce the fibrous preform, then a step S20 of mounting the fibrous preform in a mould, then a step S30 of injecting, in the mould, the resin, in order to impregnate the fibrous preform, and finally a step S40 of polymerizing the resin so as to form the vane.

In order to increase the mechanical robustness of the vane 100, the manufacturing method comprises a step S50 of reinforcing the leading edge 108 of the blade 102, by integrating the metallic reinforcement 124 on the leading edge 108. The metallic reinforcement 124 may be co-injected onto the leading edge 108 of the blade 102. Alternatively, the metallic reinforcement 124 may be bonded to the leading edge 108 of the blade 102. In order to reduce the constraints at the level of the connection fillets 120 between the blade 102 and the platforms 112, 114 of the vane 100 made of composite material, the manufacturing method comprises a step S60 of reinforcing the connection fillets 120, by integrating second metallic reinforcements 126, 128, 130, 132 on at least one portion of the pressure 108 and suction 110 segments of the platforms 112, 114 and in the separations 122. The metallic reinforcement 126, 128 may be co-injected onto at least one portion of the pressure 108 and suction 110 segments of the platforms 112, 114 and into the separations 122. Alternatively, the metallic reinforcement 126, 128 may be bonded to at least one portion of the pressure 108 and suction 110 segments of the platforms 112, 114 and in the separations 122.

The invention claimed is:

1. A method for manufacturing a vane made of composite material for a turbomachine, in particular for an aircraft, comprising the steps of:
   weaving fibers in three dimensions so as to produce a fibrous preform,
   mounting the fibrous preform in a mold,
   injecting in the mold, a resin that impregnates the fibrous preform,
   polymerizing the resin so as to form the vane, said vane comprising a blade having a pressure face and a suction face extending between a leading edge and a trailing edge, a longitudinal end of said blade being connected to a platform, the platform comprising pressure and suction segments connected to said blade by a connection fillet, and a separation being formed in said fibrous preform between said pressure and suction segments of the platform, reinforcing the leading edge of said blade, by integrating a first metallic reinforcement on the leading edge of the blade, and reinforcing the connection fillets, by integrating a second metallic reinforcement on at least one portion of the pressure and suction segments of the platform and in the separation.

2. The manufacturing method according to claim 1, wherein the step of adding the second metallic reinforcement comprises bonding the second metallic reinforcement to at least one portion of the pressure and suction segments of the platform and in the separation.

3. The manufacturing method according to claim 1, wherein the step of adding the second metallic reinforcement comprising co-injecting the second metallic reinforcement onto at least one portion of the pressure and suction segments of the platform and into the separation.

4. A vane made of composite material for a turbomachine, in particular for an aircraft, produced by a manufacturing method according to claim 1.

5. The vane according to claim 4, wherein a dimension of the second metallic reinforcement in a longitudinal direction (Y) to the pressure and suction faces of the blade between the leading and trailing edges is equal to a dimension (lp) of the platform in said direction.

6. The vane according to claim 4, wherein the second metallic reinforcement comprises two portions, each portion of the second metallic reinforcement having a dimension (lr1, lr2) in a longitudinal direction (Y) to the pressure and suction faces of the blade between the leading and trailing edges of between 15% and 35% of a chord (C) at the longitudinal end of the blade prior to the connection fillet.

7. The vane according to claim 4, wherein a dimension (er) of the second metallic reinforcement in a longitudinal direction (X) of the blade is between 30% and 70% of a dimension (ep) of the platform in said direction.

8. The vane according to claim 4, wherein a dimension (Lr) of the second metallic reinforcement in a direction orthogonal to a longitudinal direction (X) of the blade and to the longitudinal direction (Y) of the pressure and suction faces of the blade between the leading and trailing edges is at least equal to a dimension of the platform in said direction.

9. The vane according to claim 4, wherein the platform is a platform radially internal to the stator vane with respect to an axis of said stator vane, and in which the second metallic reinforcement comprises, at a longitudinal end facing the trailing edge of the blade, a protuberance extending orthogonally to said platform.

10. The vane according to claim 4, wherein the second metallic reinforcement is made of titanium.

11. A vane of composite material for a unducted fan, in particular for an aircraft, produced by a manufacturing method according to claim 1.

\* \* \* \* \*